United States Patent
Albach et al.

(10) Patent No.: US 6,822,011 B2
(45) Date of Patent: Nov. 23, 2004

(54) WATER-BLOWN FOAMS OF LOW APPARENT DENSITY

(75) Inventors: Rolf Albach, Köln (DE); Eduard Mayer, Dormagen (DE); Juan Cirujeda-Ranzenberger, Barcelona (ES)

(73) Assignee: Bayer Aktiengesellschaft, Leverkusen (DE)

( * ) Notice: Subject to any disclaimer, the term of this patent is extended or adjusted under 35 U.S.C. 154(b) by 87 days.

(21) Appl. No.: 10/282,706

(22) Filed: Oct. 29, 2002

(65) Prior Publication Data

US 2003/0096883 A1 May 22, 2003

(30) Foreign Application Priority Data

Oct. 31, 2001 (DE) .......................................... 101 53 690

(51) Int. Cl.[7] .............................................. C08G 18/70
(52) U.S. Cl. ....................... 521/137; 521/130; 521/131; 521/170; 521/174
(58) Field of Search ................................. 521/130, 131, 521/137, 170, 174

(56) References Cited

U.S. PATENT DOCUMENTS

| 4,695,596 A | * | 9/1987 | Berkowitz ................... 521/137 |
| 5,179,146 A | | 1/1993 | Muller et al. |
| 5,451,614 A | * | 9/1995 | Green et al. ................. 521/129 |
| 5,919,395 A | * | 7/1999 | Bastin et al. ........... 252/182.24 |

FOREIGN PATENT DOCUMENTS

EP      0 258 681      3/1988

* cited by examiner

*Primary Examiner*—John M. Cooney, Jr.
(74) *Attorney, Agent, or Firm*—Joseph C. Gil; Lyndanne M. Whalen; Jennifer R. Seng

(57) ABSTRACT

The invention relates to foam having an apparent density of less than 100 kg/m$^3$, in which water is predominantly used as the blowing agent, and to products that contain such foams. The mentioned foams have a large proportion of open cells (>80%).

18 Claims, No Drawings

US 6,822,011 B2

WATER-BLOWN FOAMS OF LOW APPARENT DENSITY

FIELD OF THE INVENTION

The invention relates to foam having an apparent density of less than 100 kg/m$^3$ prepared with water as the predominant blowing agent and to uses thereof. Further the invention relates to foams having a large proportion of open cells (>80%).

BACKGROUND OF THE INVENTION

Rigid polyurethane foams are generally distinguished by their low thermal conductivity. Foams having closed cells are used for the heat insulation of hot-water cylinders, buildings, refrigerators and cooling cells, doors, pipes and tanks. Often rigid foams are also used in direct conjunction with other materials. Closed-cell polyurethane foams are nowadays mostly produced using physical blowing agents such as chlorofluorohydrocarbons, fluorohydrocarbons, hydrocarbons and chlorofluorocarbons. Besides their considerable advantages in improving heat insulation, such materials often have disadvantages with environmental compatibility or safety in the workplace due to their effect on the ozone layer or due to their combustibility. Their use is therefore limited by international agreements or is associated with, in some cases, considerable costs as a result of the necessary safety measures.

If physical blowing agents are dispensed with and water is used on its own as a chemical blowing agent, good heat-insulating foams can likewise be produced. Due to the uneven rates of diffusion of carbon dioxide out of the cells of the foam and of air into those cells, a sub-atmospheric pressure will result in the cells when the foam contains predominantly closed cells. The mechanical load associated therewith can make it necessary for closed-cell rigid foams blown solely with water to have a higher strength and therefore a higher weight per unit volume than foams produced using physical blowing agents. Foams of good dimensional stability and having the same, or lower, weights per unit volume as those customarily achieved using physical blowing agents can be obtained if a high content of open cells is established in the foam. The thermal conductivity is then slightly higher, but is still adequate for many of the above-mentioned applications.

There are various possible methods of adjusting the content of open cells. First of all, polyol formulations in the form of a suspension of fine particles or in the form of emulsions are suitable. Such particles can be fluorinated polymers, as disclosed in U.S. Pat. Nos. 5,250,579, 5,856, 678, and 5,721,284, salts of saturated carboxylic acids (including fatty acids) having divalent or lithium cations, see for example U.S. Pat. Nos. 5,262,447 and 5,457,138, WO 96/37533, EP-A 547 515, and EP-A 581 191, or thermoplastic polymers such as SAN or polyethylene, as disclosed in U.S. Pat. No. 5,457,138, WO 99/60045, and EP-A 1 108 514, which are added to the polyol component. According to U.S. Pat. Nos. 5,519,068 and 5,318,997, the addition of from 5 to 55% of a long-chain polyether having an OH number <60 and an EO content <5% is equally as suitable as the addition of extremely short-chain monofunctional alcohols, see also U.S. Pat. No. 5,889,067. Typical cell-opening additives are also special silicones or polyolefin waxes, as described in U.S. Pat. Nos. 5,852,065 and 5,614,566.

Typical disadvantages of such approaches are the separation of water-containing polyol formulations during storage, and the sedimentation of fine particles. For example, it is known that PTFE-containing polyols must be stirred before processing. SAN-containing polyol formulations are phase-stable only in the absence of the blowing agent water. At high water contents, such as are necessary in order to obtain foams of low apparent density, slow hydrolysis with mediation of the amines contained in the polyol can occur over the period of storage in the case of formulations containing polyester polyols.

SUMMARY OF THE INVENTION

It has now been found that those problems can be solved by suspending, emulsifying or dissolving polymers in an isocyanate and reacting the isocyanate-containing component so obtained with a water-containing polyol formulation typical for rigid polyurethane foams in a NCO/(OH+NH) ratio of from 0.5 to 3.5.

DETAILED DESCRIPTION OF THE INVENTION

The invention provides foams having an apparent density of <100 kg/m$^3$, preferably <40 kg/m$^3$, and an open cell content, measured according to DIN ISO 4590, of >80%, preferably >90%, obtainable by reaction of A) an isocyanate component containing a polymer modifier, based on graft rubber, in suspended, emulsified or dissolved form,
B) a polyol component,
C) water, optionally in combination with fluorohydrocarbons, as blowing agent, and optionally
D) catalysts, emulsifiers and other additives or auxiliary substances conventional in polyurethane chemistry, the ratio of NCO groups to isocyanate-reactive groups being from 0.5 to 3.5. In a preferred embodiment of the invention, the ratio of NCO groups to isocyanate-reactive groups is from 0.85 to 1.35. In another preferred embodiment, the ratio of NCO groups to isocyanate-reactive groups is from 2.6 to 3.3.

The isocyanate-containing component A) can be mixtures of ethylenically unsaturated polymers with isocyanates, preferably polymeric isocyanates, such as are described, for example, in EP-A 507 175. More preferably component A is a modified polyisocyanate having an NCO content of from 10 to 45 wt. %, containing i) a polyisocyanate component composed of an organic polyisocyanate that is liquid at room temperature and has an NCO content of from 15 to 50 wt. %,
ii) from 2 to 100 wt. %, based on the weight of component i), of a polymer modifier containing at least one graft rubber of particulate structure that has been swelled and is in dispersed form in component i), which graft rubber is composed of from 20 to 80 wt. % of a rubber polymer having a glass transition temperature below 0° C. and for the rest of vinyl monomers grafted thereto, and optionally
iii) known auxiliary substances and additives of polyurethane chemistry.

Such modified polyisocyanates can be prepared by mixing polyisocyanate component i), containing at least one organic polyisocyanate that is liquid at room temperature and has an NCO content of from 15 to 50 wt. %, with from 2 to 100 wt. %, based on the weight of component i), of a polymer modifier ii) containing at least one graft rubber of particulate structure that contains from 20 to 80 wt. % of a rubber polymer having a glass transition temperature below 0° C. and for the remainder vinyl monomers grafted thereto, and dispersing component ii) in component i), with swelling of component ii), optionally under the action of shear forces and elevated temperatures, optionally adding the auxiliary substances and additives iii) to the starting components i) and/or ii) and/or to the mixture during and/or after the dispersing step.

Starting materials i) are organic polyisocyanates that are liquid at room temperature and have an NCO content of from 15 to 50 wt. %, preferably from 22 to 34 wt. %. Polyisocyanate mixtures having a mean NCO content of from 15 to 50 wt. %, preferably from 22 to 34 wt. %, are often used as component i). The (mean) molecular weight of the polyisocyanate is generally from 168 to 1000, preferably from 168 to 350.

Examples of suitable polyisocyanates are hexamethylene diisocyanate, isophorone diisocyanate, trans-trans-cyclohexyl diisocyanate, the isomeric xylylene diisocyanates, 4,4'-diisocyanatodicyclohexylmethane, 2,4- and/or 2,6-diisocyanatotoluene, 4,4'-diisocyanatodiphenylmethane and optionally small amounts of 2,2'-diisocyanatodiphenylmethane and/or its higher homologues. Such mixtures are known to be formed in the phosgenation, which is known per se, of aniline-formaldehyde condensation products. Also urethane- and/or carbodiimide- and/or uretdione- and/or isocyanurate- and/or biuret-modified derivatives of such polyisocyanates can be used. The polyisocyanate component i) preferably comprises at least one aromatic polyisocyanate. Particularly suitable are polyisocyanates or polyisocyanate mixtures of the diphenylmethane group that are liquid at room temperature, or derivatives of such polyisocyanates or polyisocyanate mixtures that are liquid at room temperature.

Component ii) can be a known graft rubber containing a rubber polymer having a glass transition temperature below 0° C., preferably below −50° C., and a polymer having at least one vinyl monomer polymer grafted at least partially to the rubber. The graft rubbers suitable as polymer modifiers ii) preferably have a particulate structure with mean particle diameters ($d_{50}$ value) of from 0.1 to 0.8 $\mu$m and are used in the form of corresponding "powders" or alternatively in "coarse-grained" form, or in the form of agglomerates of such particles. The graft rubbers contain from 20 to 80 wt. %, preferably from 30 to 70 wt. %, of a rubber having the mentioned glass transition temperature and for the rest of vinyl monomers grafted thereto.

The following, for example, are suitable as rubbers for the production of the graft rubbers: diene monomer rubbers based on butadiene, isoprene, chloroprene, optionally in admixture with up to 35 wt. % of other monomers such as styrene, acrylonitrile or alkyl (meth) acrylate, olefin rubbers based on ethylene, propylene, isobutylene, vinyl acetate, carbon monoxide, alkyl acrylate and small amounts of diene monomer, or alkyl acrylate rubbers based on alkyl acrylate monomers (especially $C_1$–$C_7$-alkyl acrylate) optionally in admixture with up to 10 wt. % of other vinyl or alkyl monomers. More preferred graft rubbers ii) are produced by the free-radical grafting of vinyl monomers to a rubber polymer that is present at least partly in crosslinked form. The rubber used preferably has a gel content of at least 30 wt. %.

Suitable vinyl monomers for grafting include styrene, p-methylstyrene, $\alpha$-methylstyrene, acrylonitrile, methacrylonitrile, $C_1$–$C_6$-alkyl (meth)acrylate, vinyl acetate, vinyl ethers, maleic anhydride, maleic acid imides, (meth)acrylamides and mixtures of such monomers. Particularly suitable as graft monomers are styrene-acrylonitrile combinations or methyl methacrylate-containing combinations.

The preparation of the graft polymers suitable as component ii) preferably takes place by means of free-radical emulsion graft polymerization, which is known. The grafting reaction, emulsion polymerization and mass polymerization are described in detail in Ullmanns Encyclopedia, 4th Edition, Volume 19, pages 277–295. Graft products within the scope of the present invention are polymers that are produced by polymerization of vinyl monomers in the presence of a rubber. True graft products and ungrafted constituents of the vinyl monomer polymer are formed during the grafting reaction. Within the present invention, "graft rubber" is understood as meaning mixtures of those two components.

The auxiliary substances and additives used in polyurethane chemistry iii), which are optionally present in the modified polyisocyanates according to the present invention are those of the type described by way of example in Ullmanns Encyclopedia, 4th Edition, Volume 19, pages 92–111. Preferably, the auxiliary substances and additives iii) are those which can be formulated in a storage-stable manner in the systems according to the present invention, for example inhibitors, surfactants, flame-proofing additives, fillers, antioxidants, release agents, biocides, colorants, plasticizers, adhesion promoters, antistatics and dehydrating agents, for example tosyl isocyanate, in small amounts.

For the preparation of the isocyanate-containing component A), the organic polyisocyanates i) are preferably placed in a vessel, and the polymer modifiers ii) are introduced, with stirring, into component i) in the vessel, the amount of component ii) preferably being from 5 to 50 wt. %, based on the weight of component i). The mixture is preferably heated to elevated temperatures up to 120° C., preferably from 80 to 120° C. It is, however, also possible to mix the polymer modifiers ii) with the polyisocyanate component i) at room temperature, for example by placing component ii) in "coarse" form in a vessel and covering it with component i) and then stirring the mixture at room temperature with the exclusion of atmospheric moisture and preferably under an inert gas (e.g. nitrogen) or under a vacuum.

In both cases a modified polyisocyanate is formed having polymer modifiers ii) present in dispersed and swelled form. The degree of swelling of the polymer modifiers ii) present in dispersed form in component i) is generally from 2 to 6. The determination of the degree of swelling serves to characterize the interaction of polymers with swelling agents. The methods of determination are described in Hoffmann, Martin: "Polymeranalytik" Volume I and II (1977) [ISBN 3-13-519701-8, ISBN 3-13-519801-4].

As components of the polyol B) there are used, for example, reaction products of polyhydric alcohols and amines, such as propylene glycol, ethylene glycol, sucrose, sorbitol, glycerol, trimethylolpropane, pentaerythritol, diaminotoluene, ethylenediamine, triethanolamine, water, ammonia and others, with epoxides such as ethylene oxide and/or propylene oxide and/or others, polyester polyols, hydroxy- and amino-functionalized natural substances, crosslinkers, activators, foam stabilizers, if necessary flame-proofing agents and other auxiliary substances. The mixing ratios vary within a wide range.

Water is used as the blowing agent C), generally in an amount >1 wt. %, preferably >3 wt. %, particularly preferably >5 wt. %, based on the amount of polyol component B). Up to 10 mol % of the amount of blowing agent can be a fluorohydrocarbon, such as 1,1,1,2-tetrafluoroethane (R134a). In general, the amount of fluorohydrocarbon used may be up to 4 wt. %, based on the polyol component B).

EXAMPLES

The components were adjusted to a temperature of 23° C. and mixed for five seconds by means of a stirrer (42 Hz). The mixture was introduced into a mold having a base area of 19×19 cm² and was allowed to rise freely.

| | |
|---|---|
| Polyol A | (OH number 254, mean functionality 3.1) contains commercial polyether polyols based on toluenediamine, trimethylolpropane and sucrose and also of polypropylene glycol having a number-average molecular weight of 2000, and contains <10% flameproofing agent tris(chloropropyl) phosphate and 0.3% Niax ® A1(Witco Surfactants GmbH, D-36396 Steinau) as activator. |
| Polyol B | (OH number 275, mean functionality 3.0) contains commercial polyether polyols based on toluenediamine, trimethylolpropane and sucrose and also of polypropylene glycol, produced with KOH catalysis, having a number-average molecular weight of 2000, and contains <10% flameproofing agent tris(chloropropyl) phosphate and 0.3% Niax ® A1 as activator. |
| Polyol C | (OH number 275, mean functionality 3.0) contains commercial polyether polyols based on toluenediamine, trimethylolpropane and sucrose and also of polypropylene glycol, produced by double-metal-cyanide catalysis, having a number-average molecular weight of 2000, and contains <10% flameproofing agent tris(chloropropyl) phosphate and 0.3% Niax ® A1 as activator. |
| Polyol D | (OH number 215, mean functionality 2.5) contains polyether polyols based on sucrose and aliphatic amine, polyester polyol based on glycerol, aliphatic and aromatic phosphate and foam stabilizer (Tegostab ® B8443, Goldschmidt AG, D-45127 Essen). |
| Isocyanate A | Polymeric isocyanate of the diphenylmethane group having an NCO content of approx. 31.5 wt. % and a viscosity of approx. 0.2 Pa · s (Desmodur ® 44V20L, Bayer AG). |
| Isocyanate B | Polymer-modified isocyanate based on Isocyanate A, containing 3.5 wt. % of a polymer of 58 wt. % butadiene, 31 wt. % styrene and 11 wt. % acrylonitrile. |
| Isocyanate C | Polymer-modified isocyanate based on Isocyanate A, containing 1.15 wt. % of a polymer of 58 wt. % butadiene, 31 wt. % styrene and 11 wt. % acrylonitrile. |
| Isocyanate D | Polymer-modified isocyanate based on Isocyanate A, containing 0.59 wt. % of a polymer of 58 wt. % butadiene, 31 wt. % styrene and 11 wt. % acrylonitrile. |
| Isocyanate E | Polymer-modified isocyanate based on Isocyanate A, containing 0.23 wt. % of a polymer of 58 wt. % butadiene, 31 wt. % styrene and 11 wt. % acrylonitrile. |
| Isocyanate F | Polymer-modified isocyanate based on Isocyanate A, containing 0.23 wt. % of a polymer of 58 wt. % butadiene, 31 wt. % styrene and 11 wt. % acrylonitrile, and 1.5 wt. % expanded graphite. |
| Isocyanate G | Polymer-modified isocyanate based on Isocyanate A, containing 7.5 wt. % of a polymer of 58 wt. % butadiene, 31 wt. % styrene and 11 wt. % acrylonitrile, and 1.5 wt. % expanded graphite. |
| Stabilizer | Silicone stabilizer (Tegostab ® B8433, Goldschmidt AG, D-45127 Essen) |

TABLE 1

| Example | 1* | 2 | 3 | 4 | 5 | 6 |
|---|---|---|---|---|---|---|
| Polyol A [parts by weight] | 91.6 | 91.6 | 91.6 | 91.6 | 91.6 | 91.6 |
| Water [parts by weight] | 5.4 | 5.4 | 5.4 | 5.4 | 5.4 | 5.4 |
| Benzyldimethylamine [parts by weight] | 1.8 | 1.8 | 1.4 | 1.4 | 1.4 | 1.4 |
| Stabilizer [parts by weight] | 1.2 | 1.2 | 1.2 | 1.2 | 1.2 | 1.2 |
| Polyisocyanate A [parts by weight] | 125 | — | — | — | — | — |

TABLE 1-continued

| Example | 1* | 2 | 3 | 4 | 5 | 6 |
|---|---|---|---|---|---|---|
| Polyisocyanate B [parts by weight] | — | 130 | — | — | — | — |
| Polyisocyanate C [parts by weight] | — | — | 130 | — | — | — |
| Polyisocyanate D [parts by weight] | — | — | — | 125 | — | — |
| Polyisocyanate E [parts by weight] | — | — | — | — | 127 | — |
| Polyisocyanate F [parts by weight] | — | — | — | — | — | 129 |
| Stirring time [s] | 5 | 5 | 5 | 5 | 5 | 5 |
| Rest time [s] | 10 | 12 | 14 | 15 | 14 | 15 |
| Curing time [s] | 51 | 63 | 66 | 70 | 69 | 70 |
| Blowing after [s] | — | 65 | 65 | 70 | 80 | 80 |
| Free apparent density [kg/m³] | 21.8 | 22.4 | 22.8 | 22.6 | 23.0 | 22.5 |
| Foam shrinkage at 100° C. (free apparent density, 24 h storage) [%] | >20 | <2 | <2 | <2 | <2 | <2 |
| Open cell content at 32 kg/m³ [%] | 70 | 98 | 94 | 92 | 91 | 93 |

*Comparative example

TABLE 2

| Example | 7 | 8 |
|---|---|---|
| Polyol B [parts by weight] | 90.3 | 0 |
| Polyol C [parts by weight] | 0 | 90.3 |
| Benzyldimethylamine [parts by weight] | 1.8 | 1.8 |
| Stabilizer [parts by weight] | 1.5 | 1.5 |
| Water [parts by weight] | 6.4 | 6.4 |
| Polyisocyanate B [parts by weight] | 150 | 150 |
| Stirring time [s] | 5 | 5 |
| Rest time [s] | 12 | 11 |
| Curing time [s] | 60 | 58 |
| Free apparent density [kg/m³] | 20.8 | 20.6 |
| Shrinkage free foam (100° C., 3 h) | no | no |
| Shrinkage free foam (100° C., 20 h) | no | no |

TABLE 3

| Example | 9* | 10 |
|---|---|---|
| Polyol D [parts by weight] | 100 | 100 |
| Catalyst1 [parts by weight] | 7 | 7 |
| Water [parts by weight] | 2.5 | 2.5 |
| Polyisocyanate A [parts by weight] | 300 | — |
| Polyisocyanate G [parts by weight] | — | 300 |
| Stirring time [s] | 15 | 15 |
| Rest time [s] | 42 | 42 |
| Curing time [s] | 85 | 85 |
| Free apparent density [kg/m³] | 85 | 91 |
| Open cell content from free foam [%] | 30 | 97 |

1 Potassium acetate in diethylene glycol (Desmorapid ® VP.PU 1792, Bayer AG)

The small burner test according to DIN 4102 gave a fire path of in each case from 50 to 70 mm for Comparative Example 9 and Example 10 on ignition at the edge.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane-group-containing foam having an apparent density <100 kg/m$^3$ and an open cell content of >80%, prepared by reacting
   A) an isocyanate component comprising a polymer modifier, wherein the polymer modifier comprises a graft rubber suspended, emulsified or dissolved in the isocyanate component,
   B) a polyol component,
   C) water, optionally in combination with a fluorohydrocarbon and, optionally
   D) catalysts, emulsifiers, other additives or auxiliary substances,
   wherein the ratio of NCO groups to isocyanate-reactive groups is from 0.5 to 3.5.

2. The foam according to claim 1, wherein the isocyanate component comprises a polyisocyanate having an NCO content from 15 to 50 wt. %.

3. The foam according to claim 1, wherein the polyisocyanate is hexamethylene diisocyanate, isophorone diisocyanate, trans-trans-cyclohexyl diisocyanate, isomeric xylylene diisocyanates, 4,4'-diisocyanato-dicyclohexylmethane, 2,4- and/or 2,6-diisocyanatotoluene, 4,4'-diisocyanatodiphenylmethane and optionally small amounts of 2,2'-diisocyanatodiphenylmethane or higher homologues or mixtures thereof.

4. The foam according to claim 1, wherein the graft rubber comprises from 20 to 80 wt. % of a rubber having a glass transition temperature below 0° C. and a vinyl monomer grafted thereto.

5. The foam according to claim 4, wherein the rubber is a diene monomer rubber based on butadiene, isoprene, chloroprene, optionally in admixture with up to 35 wt. % of styrene, acrylonitrile or alkyl (meth) acrylate, an olefin rubber based on ethylene, propylene, isobutylene, vinyl acetate, carbon monoxide, alkyl acrylate and a small amount of diene monomer, or an alkyl acrylate rubber based on an alkyl acrylate monomer, optionally in admixture with up to 10 wt. % of a vinyl or alkyl monomer.

6. The foam according to claim 4, wherein the vinyl monomer is styrene, p-methylstyrene, α-methylstyrene, acrylonitrile, methacrylonitrile, $C_1$–$C_6$-alkyl (meth)acrylate, vinyl acetate, vinyl ethers, maleic anhydride, maleic acid imides, (meth)acrylamides or mixtures thereof.

7. The foam according to claim 1, wherein the polyol is a reaction product of a polyhydric alcohol and an amine.

8. The foam according to claim 1, wherein the amount of water present is greater than 1 wt. %, based upon the polyol component.

9. The foam according to claim 1, wherein the fluorohydrocarbon is 1,1,1,2-tetrafluoroethane.

10. A process for the preparation of a polyurethane-group-containing foam having an apparent density <100 kg/m$^3$ and an open cell content of >80%, comprising the step of reacting
    A) an isocyanate component comprising a polymer modifier, wherein the polymer modifier comprises a graft rubber suspended, emulsified or dissolved in the isocyanate component, with a
    B) a polyol component,
    C) water, optionally in combination with a fluorohydrocarbons and, optionally
    D) a catalyst, emulsifier, other additive or auxiliary substance, wherein the ratio of NCO groups to isocyanate-reactive groups is from 0.5 to 3.5.

11. The process according to claim 10, wherein the isocyanate component comprises a polyisocyanate having an NCO content from 15 to 50 wt. %.

12. The process according to claim 10, wherein the polyisocyanate is hexamethylene diisocyanate, isophorone diisocyanate, trans-trans-cyclohexyl diisocyanate, isomeric xylylene diisocyanates, 4,4'-diisocyanato-dicyclohexylmethane, 2,4- and/or 2,6-diisocyanatotoluene, 4,4'-diisocyanatodiphenylmethane and optionally small amounts of 2,2'-diisocyanatodiphenylmethane or higher homologues or mixtures thereof.

13. The process according to claim 10, wherein the graft rubber comprises from 20 to 80 wt. % of a rubber having a glass transition temperature below 0° C. and a vinyl monomer grafted thereto.

14. The process according to claim 13, wherein the rubber is a diene monomer rubber based on butadiene, isoprene, chloroprene, optionally in admixture with up to 35 wt. % of styrene, acrylonitrile or alkyl (meth) acrylate, olefin rubber based on ethylene, propylene, isobutylene, vinyl acetate, carbon monoxide, alkyl acrylate and a small amount of diene monomer, or an alkyl acrylate rubber based on an alkyl acrylate monomer, optionally in admixture with up to 10 wt. % of a vinyl or alkyl monomer.

15. The process according to claim 13, wherein the vinyl monomer is styrene, p-methylstyrene, α-methylstyrene, acrylonitrile, methacrylonitrile, C1–6-alkyl (meth)acrylate, vinyl acetate, vinyl ethers, maleic anhydride, maleic acid imide, (meth)acrylamide or a mixture thereof.

16. The process according to claim 10, wherein the polyol is a reaction product of a polyhydric alcohol and an amine.

17. The process according to claim 10, wherein water is present in an amount greater than 1 wt. %, based upon the polyol component.

18. The process according to claim 10, wherein the fluorohydrocarbon is 1,1,1,2-tetrafluoroethane.

* * * * *